No. 774,872. Patented November 15, 1904.

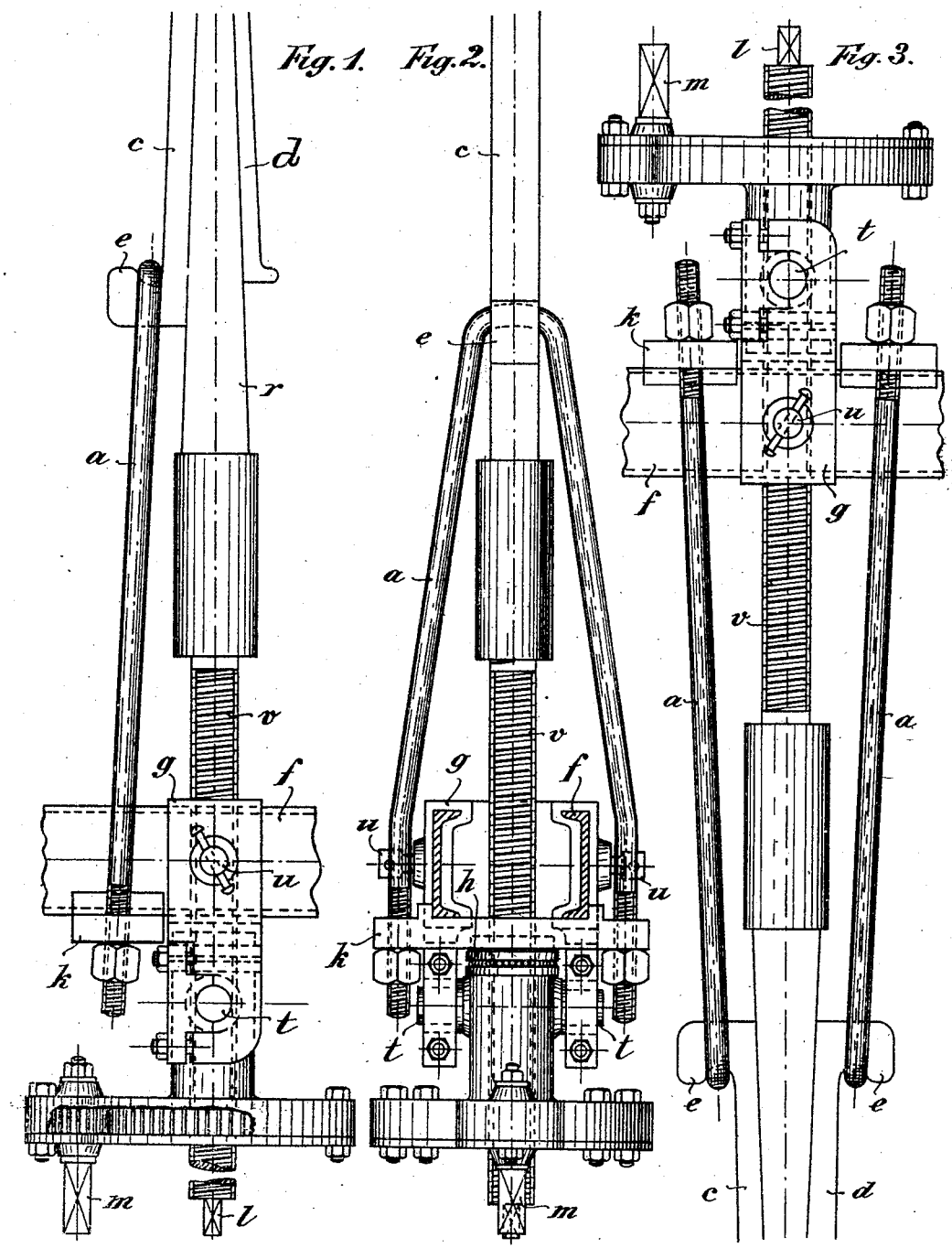

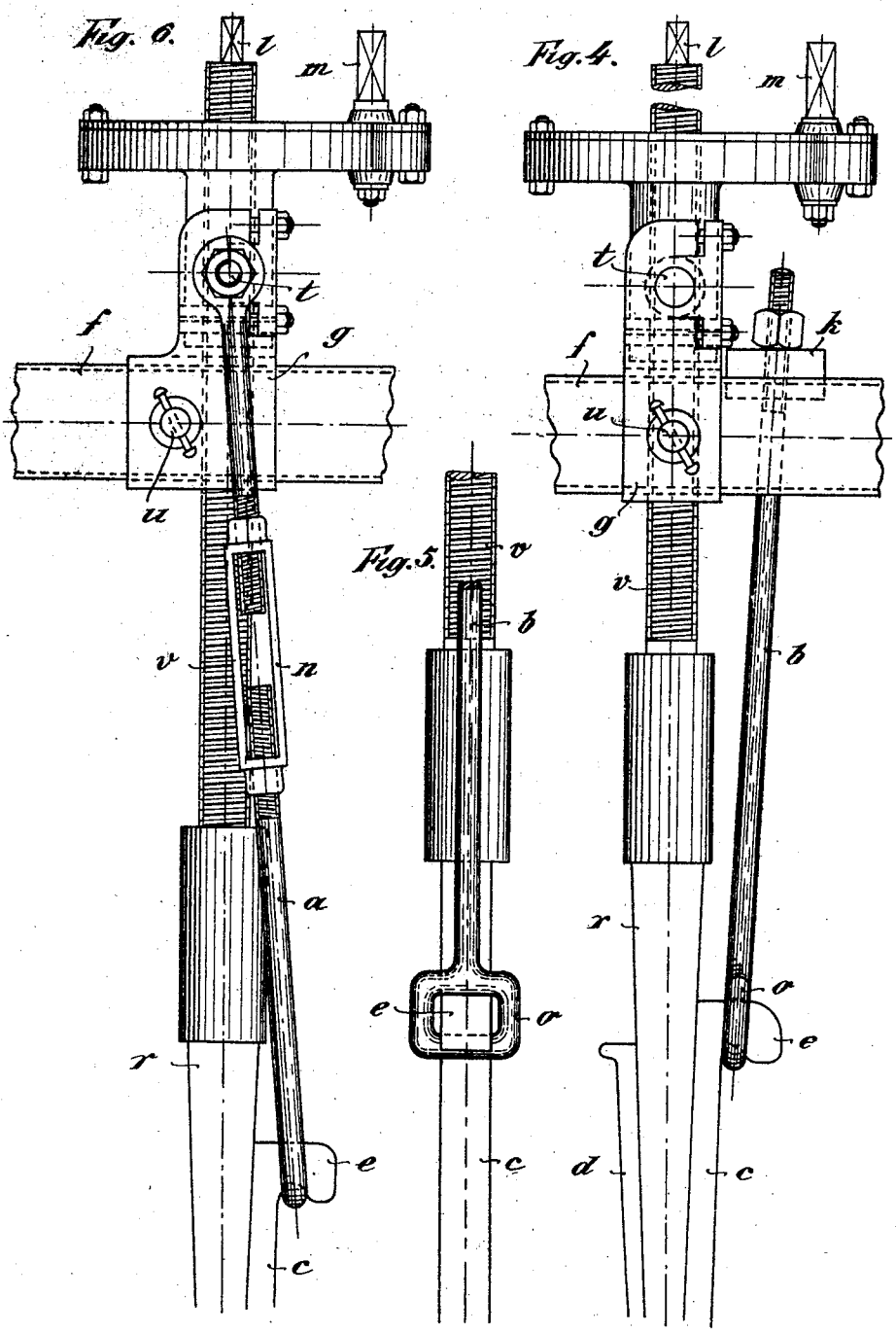

UNITED STATES PATENT OFFICE.

ALBERT FRANÇOIS, OF LIEGE, BELGIUM.

APPARATUS FOR SINKING CLEAVING-WEDGES.

SPECIFICATION forming part of Letters Patent No. 774,872, dated November 15, 1904.

Application filed November 21, 1903. Serial No. 182,137. (No model.)

*To all whom it may concern:*

Be it known that I, ALBERT FRANÇOIS, a subject of the King of Belgium, residing at 21 Rue du Parc, Liege, Belgium, have invented certain new and useful Improvements in Apparatus for Sinking Cleaving-Wedges; and I do hereby declare the following to be a full, clear, and exact description of the invention, such as will enable others skilled in the art to which it appertains to make and use the same.

The object of the present invention is a wedge-driver for rock and the like cleaving apparatus acting by continuous pressure on the head of the wedge and in which the two keys or cheek-plates of the wedge, or only one of them, are connected to the carriage supporting the apparatus, so as to make these keys fast to the carriage, and consequently to the wedge-driver, by means of plain rods, tie-rods, jointed chains, or the like adapted to be easily erected and removed. This arrangement also allows at a single setting up and without altering the position or adjustment of the carriage the preliminary hole to be drilled and then the sinking or forcing of the wedge therein. Various methods of constructing such a wedge-driver are shown in the annexed drawings, in which—

Figures 1 and 2 represent side elevations from different points of view of one form of my improved wedge-driver, portions of the supporting-carriage being also shown in said figures. Fig. 3 represents in elevation another embodiment of the invention. Fig. 4 represents in elevation another embodiment of the invention. Fig. 5 represents a detail looking from the right of Fig. 4. Fig. 6 is a view similar to Fig. 4, representing another modification.

Figs. 1 and 2 show a wedge-driver of this type mounted on its carriage $f$ by means of guides or slides $g$ and trunnions $t$. The carriage $f$ is fixed in any suitable manner to the roof and the floor of the gallery, while clamping-screws $u$ maintain the slides $g$, and the pivots or trunnions $t$ allow the wedge-driver to be given any desired inclination. The rectilinear advance of the wedge-driver is effected in a continuous and regular manner by suitable gearing—such, for instance, as a pinion and toothed wheel, as shown in Fig. 1, operated by a handle $m$ to rotate an internally-threaded sleeve through which passes the screw $v$ of the wedge-driver. At its forward end this sleeve is fitted with a collar or abutment $h$, resting on a ball-bearing. A handle placed on the square end $l$ permits, as a preliminary, the screw $v$ to be rapidly brought against the head of the wedge $r$ by the rotation of this screw in the threaded sleeve. One of the keys or cheek-plates $c$ of the wedge is fitted with a hook or head $e$, with which engages a rod or bridle $a$ of elongated U shape, the two ends of which are screwed and bolted behind a cross-piece $k$ simply resting on the carriage $f$. In this way the wedge and the carriage are held together, so as to prevent distortion or deflection of the former.

Fig. 3 shows a similar arrangement in which the two keys or cheek-plates $c$ and $d$ are each connected to the cross-piece $k$ by means of a bridle or strap $a$, made of a rod of elongated U shape.

In the construction shown, respectively, in side elevation and plan in Figs. 4 and 5 the one or two bridles $a$ of the arrangements previously described have been replaced by a simple tie-rod $b$, having at its front end a ring or eyelet $o$, embracing the head or hook $e$ of the key $c$. In this case the rod $b$ passes between the two sides of the carriage $f$, and it is fastened and tensioned in a similar manner as before to the cross-piece $k$, which rests on this carriage. The second key or cheek-plate might also be connected to the carriage by a second similar tie-rod.

Fig. 6 shows a wedge-driver acting by regular pressure, in which the tie-rod $a$ or $b$ is directly fixed at its ends to the extended pivots or trunnions $t$, which serve to support the wedge-driver on the slide, while a screw-coupling $n$, having right and left hand nuts, allows the length of the tie-rods to be adjusted. Similarly the tie-rods or bridles might partly or wholly be replaced by chains for the purpose of securing the wedge fast to the driver or its carriage.

The method of effecting the regular advance of the wedge may be of any kind, and the one or other of the systems of attachment may be applied thereto.

The same screw $v$ of the various arrangements described and to which it is possible to impart a rotary motion by means of a handle placed on the square end $l$ serves also for the drilling of the preliminary hole in the rock. It is then sufficient to replace the bit by the wedge $r$, to place the keys $c$ and $d$ in position and connect these latter to the carriage by means of the tie-rods or bridles $a$ or $b$, the length of which can be adjusted, without any other modification. The rate and accuracy of the work are in this way considerably increased.

Having thus described my invention, what I claim as such, and desire to secure by Letters Patent, is—

1. A cleaving apparatus comprising a carriage, a feed-screw, means for actuating said feed-screw, a wedge, a key, and a removable bridle carried by said carriage and adapted to be connected with the key of the said wedge.

2. A cleaving apparatus comprising a carriage, a feed-screw supported by said carriage, a wedge and key, means for actuating said feed-screw whereby a continuous pressure is maintained upon the head of the said wedge, and an adjustable and removable bridle carried by said carriage and having a connection with the key of the said wedge.

In testimony whereof I affix my signature in presence of two witnesses.

ALBERT FRANÇOIS.

Witnesses:
  JEAN VEURES,
  MAURICE ILERVA.